United States Patent
Zhang et al.

(10) Patent No.: US 11,643,518 B2
(45) Date of Patent: May 9, 2023

(54) FOAMING COMPOSITION

(71) Applicant: Henkel AG & Co. KGaA, Duesseldorf (DE)

(72) Inventors: Xinyu Zhang, Shanghai (CN); Qi Chen, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 209 days.

(21) Appl. No.: 16/906,340

(22) Filed: Jun. 19, 2020

(65) Prior Publication Data

US 2020/0317881 A1 Oct. 8, 2020

Related U.S. Application Data

(63) Continuation of application No. PCT/CN2017/118000, filed on Dec. 22, 2017.

(51) Int. Cl.

| *C08J 9/10* | (2006.01) |
|---|---|
| *C08J 9/228* | (2006.01) |
| *C08J 9/16* | (2006.01) |
| *C08J 9/00* | (2006.01) |
| *C08K 5/00* | (2006.01) |
| *C08K 5/05* | (2006.01) |
| *C08K 5/14* | (2006.01) |
| *C08K 5/17* | (2006.01) |
| *C08K 5/5313* | (2006.01) |
| *C08K 5/5317* | (2006.01) |

(52) U.S. Cl.
CPC ........... *C08J 9/16* (2013.01); *C08J 9/0023* (2013.01); *C08J 9/0028* (2013.01); *C08J 9/103* (2013.01); *C08J 9/105* (2013.01); *C08J 9/228* (2013.01); *C08J 2201/03* (2013.01); *C08J 2331/04* (2013.01); *C08K 5/005* (2013.01); *C08K 5/0025* (2013.01); *C08K 5/05* (2013.01); *C08K 5/14* (2013.01); *C08K 5/17* (2013.01); *C08K 5/5313* (2013.01); *C08K 5/5317* (2013.01)

(58) Field of Classification Search
CPC . C08J 9/16; C08J 9/0023; C08J 9/0028; C08J 9/103; C08J 9/105; C08J 9/228; C08J 2201/03; C08J 2331/04; C08K 5/0025; C08K 5/005; C08K 5/05; C08K 5/14; C08K 5/17; C08K 5/5313; C08K 5/5317
See application file for complete search history.

(56) References Cited

U.S. PATENT DOCUMENTS

| 3,920,591 A | 11/1975 | Jacobs et al. |
|---|---|---|
| 4,289,856 A | 9/1981 | Masaki et al. |
| 4,331,779 A | 5/1982 | Park |
| 4,517,317 A | 5/1985 | Tada |
| 7,249,415 B2 | 7/2007 | Larsen et al. |
| 7,855,250 B2 | 12/2010 | Ui et al. |
| 2007/0249743 A1* | 10/2007 | Sehanobish ............... C08J 9/04 |
| | | 521/134 |
| 2008/0269364 A1 | 10/2008 | Ui et al. |
| 2009/0239962 A1 | 9/2009 | Dobashi |
| 2014/0088211 A1* | 3/2014 | Hayashi .................. C08J 9/236 |
| | | 521/59 |

FOREIGN PATENT DOCUMENTS

| CN | 1272861 A | 11/2000 |
|---|---|---|
| CN | 101838416 A | 9/2010 |
| CN | 102181091 A | 9/2011 |
| CN | 102807702 A | 12/2012 |
| CN | 103351448 A | 10/2013 |
| CN | 103717655 A | 4/2014 |
| CN | 103788463 A | 5/2014 |
| CN | 104419056 A | 3/2015 |
| CN | 107418066 A | 12/2017 |
| JP | 07173316 A | 7/1995 |
| KR | 20050087967 A | 9/2005 |
| WO | 2017102996 A1 | 6/2017 |

OTHER PUBLICATIONS

International Search Report for PCT/CN2017/118000 dated Oct. 8, 2018.
Supplementary Search Report for EP 17935409 dated Jun. 21, 2021.

\* cited by examiner

*Primary Examiner* — Kara B Boyle
(74) *Attorney, Agent, or Firm* — Mary K. Cameron

(57) ABSTRACT

This invention relates to a foaming composition, comprising at least one ethylene-vinyl acetate (EVA) copolymer; at least one foaming agent; at least one peroxide compound; at least one polyamine; at least one crosslinking enhancer; at least one primary antioxidant; and at least one secondary antioxidant; the content of the crosslinking enhancer is from 0.1 to 3% by weight based on the total weight of the composition. A foaming article cured from the foaming composition under the temperature range of 80 to 120° C. according to the present invention exhibits high initial volume expansion ratio at the baking window from 130 to 200° C. and shows excellent stability after storage.

18 Claims, No Drawings

FOAMING COMPOSITION

TECHNICAL FIELD

This invention relates to a foaming composition, comprising at least one ethylene-vinyl acetate (EVA) copolymer; at least one foaming agent; at least one peroxide compound; at least one amine; at least one crosslinking enhancer; at least one primary antioxidant; and at least one secondary antioxidant; the content of the crosslinking enhancer is from 0.1 to 3% by weight based on the total weight of the composition. A foaming article made by curing the foaming composition in the temperature range of 80 to 120° C. according to the present invention exhibits high initial volume expansion ratio at the baking window from 130 to 200° C. and shows excellent stability after storage.

BACKGROUND OF THE INVENTION

Foaming materials have been widely used in noise control applications at many places in automotive, airplanes as well as building acoustics.

For the application in automotive, normally a foaming article made from a foaming composition comprising foaming material, such as ethylene-vinyl acetate (EVA) copolymer, is heated at a baking window from 160 to 200° C. depending on the production line of the automotive. The foaming article made from the existing foaming composition exhibits good volume expansion during the current foaming process. However, the current baking window requires high energy inputs and does not meet with the global trend of energy saving.

Therefore, there is a need for developing a foaming composition, and a foaming article made from the foaming composition which is able to expand sufficiently at a lower temperature baking window from 130 to 150° C. The foaming article is desired to be also applicable to the existing automotive production lines with the baking window from 160 to 200° C.

SUMMARY OF THE INVENTION

The present invention relates to a foaming composition, comprising:
(a) at least one EVA copolymer;
(b) at least one foaming agent;
(c) at least one peroxide compound;
(d) at least one amine;
(e) at least one crosslinking enhancer;
(f) at least one primary antioxidant; and
(g) at least one secondary antioxidant;
wherein the content of the crosslinking enhancer is from 0.1 to 3% by weight based on the total weight of the composition.

A foaming article made from the foaming composition exhibits high initial volume expansion ratio at the baking window from 130 to 200° C. and shows excellent stability after storage under a condition of 40° C. and 50% RH for 6 months.

The present invention also relates to a foaming article made by curing the foaming composition in the temperature range of 80 to 120° C., and preferably in the temperature range of 95 to 105° C.

The present invention also relates to a foaming article made from the foaming composition by the steps of:
a) mixing the components of the foaming composition to form a homogeneous mixture in the temperature of 15 to 55° C.;
b) obtaining foaming granules by graining the homogeneous mixture by extrusion in the temperature of 90 to 100° C.; and
c) forming the foaming article from the foaming granules by injection molding in the temperature of 95 to 105° C.

The present invention also relates to a foamed article made from the foaming composition.

The present invention also relates to a foamed article made from the foaming article.

The present invention also relates to a vehicle comprising a vehicle part filled with the foamed article, wherein the vehicle part may be a pillar, a door or a vehicle body.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

EVA Copolymer

The EVA copolymer of the present invention refers to any common EVA copolymer, preferably having a vinyl acetate (VA) content of 12% by weight or more and a melt index of 2 to 25 grams per 10 minutes at 190° C./2.16 kg, and more preferably having a VA content of 18% to 30% by weight and a melt index of 2.5 to 15 grams per 10 minutes at 190° C./2.16 kg measured by ASTM D1238. Examples of commercially available EVA copolymers are, for example, Elvax 250 from Dupont; Elvax 260 from Dupont; and Elvax 460 from Dupont.

In some embodiments of the present invention, the amount of EVA copolymer in the foaming composition of the invention is from 45% to 70%, and preferably from 50% to 60% by weight based on the total weight of the composition.

Foaming Agent

The foaming agent of the present invention refers to any common foaming agent, and may be selected from 4,4'-oxybis(benzenesulfonyl hydrazide) (OBSH), azodicarbonamide, diisopropyl azodicarboxylate and any combination thereof.

In some embodiments of the present invention, the foaming agent preferably is OBSH. Examples of commercially available foaming agents are, for example, OBSH from IMCD Australia Limited; and OBSH from Western Reserve Chemical.

In some embodiments of the present invention, the amount of the foaming agent of the invention is from 15 to 30%, and preferably from 20 to 25% by weight based on the total weight of the composition.

Peroxide Compound

The peroxide compound of the present invention refers to any common peroxide compound and preferably organic peroxides. The peroxide compound functions as a crosslinking agent for the crosslinking of EVA copolymer.

Examples of the peroxide compounds include but not limited to 2,5-dimethyl-2,5-di(tert-butylperoxy) hexane, tert-butyl peroxybenzoate, benzoyl peroxide, di(tert-butylperoxyisopropyl) benzene, dicumyl peroxide, 1,1-di(t-butylperoxy)-3,3,5-trimethylcyclohexane, butyl 4,4-bis(tert-butyldioxy) valerate and any combination thereof. Examples of commercially available peroxide compounds, for example, are DCP40 from Arkema; and Varox 231XL from Vanderbilt Chemicals;

In some embodiments of the present invention, the amount of the peroxide compound is from 0.1 to 10%, preferably from 0.2 to 6% and more preferably from 1.5 to 3% by weight based on the total weight of the composition.

Amine

The amine of the present invention refers to an amine, for example any common polyamine. The anime functions as a crosslinking agent for the crosslinking of EVA copolymer.

Examples of the amine include but are not limited to diethyltoluenediamine, chlorodiaminobenzene, diethanolamine, diisopropanolamine, triethanolamine, tripropanolamine,-1,6-hexanediamine and any combination thereof. Commercially available polyamine, for example, is Fujicure-FXR-1090FA from T&K Toka.

In some embodiments of the present invention, the amount of the amine is from 0.001% to 2%, and preferably from 0.005% to 0.5% by weight based on the total weight of the composition.

Crosslinking Enhancer

The crosslinking enhancer of the present invention refers to any common crosslinking enhancer which is able to induce foaming at lower temperature. The crosslinking enhancer includes but not limited to trimethylolpropane trimethacrylate, zinc diethyl dithiocarbamate, di(morpholin-4-yl) disulphide, dipentamethylenethiuram tetrasulfide and any combination thereof. Examples of commercially available crosslinking enhancers are, for example, SR350 from Sartomer; and VISIOMER TMPTMA from Evonik.

In some embodiments of the present invention, the amount of the crosslinking enhancer is from 0.1% to 3%, and preferably from 1% to 2% by weight based on the total weight of the composition.

Primary Antioxidant

The primary antioxidant of the present invention functions as hydrogen atom donors in the conversion of peroxy radical oxidation intermediates to nonradical hydroperoxides and prevents the EVA copolymer from degradation. Preferably, the primary antioxidant is selected from an amine antioxidant, a phenolic antioxidant, and any combination thereof.

In some embodiments of the present invention, the primary antioxidant preferably is a hindered phenolic antioxidant.

Examples of the primary antioxidants include but not limited to pentaerythrityl-tetrakis[3-(3,5-di-tert-butyl-4-hydroxyphenyl)-propionate], octadecyl 3-(3,5-di-tert-butyl-4-hydroxyphenyl)propionate, 3,3'-Bis(3,5-di-tert-butyl-4-hydroxyphenyl)-N,N'-hexamethylenedipropionamide and any combination thereof. Examples of commercially available primary antioxidants are, for example, Irganox 1010 from Ciba; Irganox L107 from Ciba; and Irganox L109 from Ciba.

In some embodiments of the present invention, the amount of the primary antioxidant is from 0.04 to 10%, and preferably from 0.05% to 6% by weight based on the total weight of the composition.

Secondary Antioxidant

The secondary antioxidant of the present invention is different from the primary antioxidant and works together with the primary antioxidant to further remove the hydroperoxides so that the hydroperoxides will not decompose to form new initiating radicals for oxidation. Preferably, the secondary antioxidant is selected from a phosphorus containing oxidant, a sulfurous containing oxidant and any combination thereof.

In some embodiments of the present invention, the secondary antioxidant is selected from phosphite, phosphonate and any combination thereof.

Examples of the secondary antioxidants include but not limited to bis(2,4-ditert-butylphenyl)pentaerythritol diphosphate, tris(2,4-ditert-butylphenyl) phosphite, and combinations thereof. Commercially available secondary antioxidant, for example, is Irgafos 168 from BASF.

In some embodiments of the present invention, the amount of the secondary antioxidant is from 0.01% to 2%, and preferably from 0.05% to 0.5% by weight based on the total weight of the composition.

Other Optional Additives

In some embodiments of the present invention, the foaming composition may further optionally include other additives, such as at least one wax, at least one adhesive promoter, at least one filler, at least one lubricant, at least one dye and any combination thereof.

In some embodiments of the present invention, the foaming composition may optionally include at least one wax. Preferably, the wax is a microcrystalline wax with a melting temperature of 90 to 100° C. Examples of commercially available wax are, for example, Microsere 5999A from The International Group; and BE SQUARE 185 Amber Wax from Petrolite Corp.

In some embodiments of the present invention, the foaming composition may optionally include at least one adhesive promoter. The adhesive promoter includes but not limited to terpolymer of ethylene, acrylic ester and maleic anhydride. Examples of commercially available adhesive promoter are, for example, Bondine HX 8290 Arkema; and Lotader Bondine HX 8290 from Arkema France INC.

In some embodiments of the present invention, the foaming composition may optionally include at least one filler. The filler includes but not limited to silica, mica, and talc. Commercially available filler is, for example, Talc 1250 from Beijing Lanning Talc factory.

In some embodiments of the present invention, the foaming composition may optionally include at least one lubricant. The lubricant includes but not limited to fatty alcohols and their dicarboxylic acid esters, fatty acid esters of short-chain alcohols, fatty acids, fatty acid amides. Commercially available lubricant is, for example, stearic acid from Changzhou Chemical Co., LTD.

In some embodiments of the present invention, the foaming composition may optionally include at least one dye. Preferably, the dye is carbon black. Commercially available dye is, for example, Monarch 580 from Cabot corporation.

In a preferred embodiment, the foaming composition comprises:
(a) from 45 to 70% by weight of at least one EVA copolymer;
(b) from 15 to 30% by weight of at least one foaming agent;
(c) from 0.1 to 10% by weight of at least one peroxide compound;
(d) from 0.001 to 2% by weight of at least one polyamine;
(e) from 0.1 to 3% by weight of at least one crosslinking enhancer;
(f) from 0.04 to 10% by weight of at least one primary antioxidant; and
(g) from 0.01 to 2% by weight of at least one secondary antioxidant;
the weight percentages of all components add up to 100% by weight and the content of the crosslinking enhancer is more preferably from 1 to 2% by weight based on the total weight of the composition.

A foaming article of the present invention may be made by curing the foaming composition in the temperature range of 80 to 120° C., and preferably in the temperature range of 95 to 105° C.

In some embodiments of the present invention, the foaming article may be prepared by the steps of:
a) mixing the components of the foaming composition to form a homogeneous mixture in the temperature of 15 to 55° C.;
b) obtaining foaming granules by graining the homogeneous mixture by extrusion in the temperature of 90 to 100° C.; and
c) forming foaming articles from the foaming granules by injection molding in the temperature of 95 to 105° C.

A foamed article of the present invention may be prepared by heating the foaming articles in a temperature range from 130 to 200° C. In some embodiments of the present invention, the foaming article may be heated from 10 to 120 minutes, preferably from 20 to 60 minutes, and most preferably from 30 to 40 minutes.

In the present invention, the initial volume expansion ratio (R) of the foaming article may be determined by the steps of:
(a) measuring the volume of the foaming articles (Vi);
(b) obtaining foamed articles by heating the foaming articles in a temperature range from 130 to 200° C.;
(c) cooling the foamed articles to room temperature;
(d) measuring the volume of the foamed articles (Vf); and
(e) calculating the initial volume expansion ratio (R) of foaming article by the formula of $R=Vf/Vi$.

In the present invention, the volume expansion ratio (Rs) of the foaming article after storage may be determined by the steps of:
(a) measuring the volume of the foaming articles (Vi);
(b) storing the foaming articles under a condition of 40° C. and 50% RH for 6 months;
(c) obtaining foamed articles by heating the foaming articles after storage in a temperature range from 130 to 200° C.;
(d) cooling the foamed articles to room temperature;
(e) measuring the volume of the foamed articles (Vs); and
(f) calculating the volume expansion ratio (Rs) of foaming article after storage by the formula of $Rs=Vs/Vi$.

In the present invention, the change of volume expansion ratio (Rc) of the foaming article after storage may be determined by the steps of:

$Rc=(Rs-R)/R;$ wherein Rc=the change of volume expansion ratio;
Rs=the volume expansion ratio of the foaming article after storage; and
R=the initial volume expansion ratio of the foaming article.

The foaming article of the present invention has preferably an initial volume expansion ratio (R) equal to or greater than 2400% after being heated at the temperature of 150° C.

The foaming article of the present invention has preferably an initial volume expansion ratio (R) equal to or greater than 750% after being heated at the temperature of 140° C.

The foaming article of the present invention preferably has an initial volume expansion ratio (R) equal to or greater than 360% after being heated at the temperature of 130° C.

The foaming article of the present invention preferably has a volume expansion ratio (Rs) greater than or equal to the initial volume expansion ratio (R) after being stored under a condition of 40° C. and 50% RH for 6 months.

The foaming article of the present invention preferably has a change of volume expansion ratio (Rc) of at least 5%, at least 12%, at least 22%, or at least 26% when the foaming article is stored under a condition of 40° C. and 50% RH for 6 months and then heated at the temperature of 140° C.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

Initial Volume Expansion Ratio (R) of the Foaming Article

The initial volume expansion ratio (R) of the foaming article was obtained by:
(a) mixing the components of the foaming composition to form a homogeneous mixture at the temperature of 35° C.;
(b) obtaining foaming granules by graining the homogeneous mixture with an extruding machine (MTS 50, Nanjing DETENG Machinery Co., Ltd) at the temperature of 95° C.;
(c) forming foaming articles in a plate shape with a thickness of 3 mm from the foaming granules by injection molding under the temperature of 95 to 105° C.;
(d) measuring the volume of the foaming articles (Vi) by water displacement method;
(e) obtaining foamed articles by placing the foaming articles in ovens with baking temperatures from 130 to 200° C. and heating the foaming articles for 30 minutes;
(f) cooling the foamed articles at room temperature for 24 hours;
(g) measuring the volume of the foamed articles (Vf) by water displacement method; and
(h) calculating the initial volume expansion ratio of foaming article (R) by the formula of $R=Vf/Vi$.

Volume Expansion Ratio (Rs) of the Foaming Article after Storage

The volume expansion ratio (Rs) of the foaming article after storage was obtained by:

(a) measuring the volume of the foaming articles (Vi) by water displacement method;
(b) storing the foaming articles under a condition of 40° C. and 50% RH for 6 months;
(c) obtaining foamed articles by placing the foaming articles after storage in ovens with baking temperatures from 130 to 200° C. and heating the foaming articles for 30 minutes;
(d) cooling the foamed articles at room temperature for 24 hours;
(e) measuring the volume of the foamed articles (Vs) by water displacement method; and
(f) calculating the volume expansion ratio (Rs) of foaming article by the formula of Rs=Vs/Vi.

Change of Volume Expansion Ratio (Rc) of the Foaming Article after Storage

The change of volume expansion ratio (Rc) of the foaming article after storage was calculated by the formula: Rc=(Rs−R)/R; wherein Rc=the change of volume expansion ratio; Rs=the volume expansion ratio of the foaming article after storage; and R=the initial volume expansion ratio of the foaming article.

Example 1-9

Foaming composition samples were prepared according to Table 1A and 1B, by mixing the components selected from:
  EVA 250 (Elvax 250, from Dupont Company);
  EVA 260 (Elvax 260, from Dupont Company);
  EVA 460 (Elvax 460, from Dupont Company);
  4,4'-oxybis(benzenesulfonyl hydrazide) (OBSH, from IMCD);
  trimethylolpropane trimethacrylate (SR350, from Sartomer);
  dicumyl peroxide (DCP40, from Arkema);
  n-butyl 4,4-bis(tert-butylperoxy) valerate (Varox 231XL, from Vanderbilt Chemicals);
  modified polyamine (Fujicure-FXR-1090FA, from T&K Toka);
  pentaerythrityl-tetrakis[3-(3,5-di-tert-butyl-4-hydroxyphenyl)-propionate] (Irganox 1010, from Ciba);
  tris(2,4-di-tert-butylphenyl) phosphite (Irgafos 168, from BASF);
  phenolic antioxidant (Irganox L 109, from Ciba);
  phenolic antioxidant (Irganox L107, from Ciba);
  terpolymer of ethylene, acrylic ester and maleic anhydride (Bondine HX 8290, Arkema);
  wax (Microsere 5999A, from The International Group);
  stearic acid (Stearic Acid, from Changzhou Chemical Co., LTD);
  talc (Talc 1250, from Beijing Lanning Talc factory); and
  carbon black (Monarch 580, from Cabot Corporation).

TABLE 1A

Foaming composition

| Components | Example 1 | Example 2 | Example 3 | Example 4 | Example 5 | Example 6 |
|---|---|---|---|---|---|---|
| Elvax 250 | 5 | 5 | 5 | 3 | 5 | 5 |
| Elvax 260 | 3 | 3 | 3 | 2 | 3 | 3 |
| Elvax 460 | 46 | 44 | 42 | 45 | 46 | 46 |
| OBSH | 25 | 21 | 21 | 15 | 25 | 25 |
| SR350 | 0.2 | 1 | 2 | 3 | 4 | 2 |
| DCP40 | 0.05 | 1 | 2 | 3 | 2 | |
| Varox 231XL | 0.2 | 0.5 | 1 | 3 | 1 | |
| Fujicure-FXR-1090FA | 0.005 | 0.1 | 0.5 | 1 | 0.5 | 0.5 |
| Irganox 1010 | 0.05 | 0.5 | 0.5 | 2 | 0.5 | 0.5 |
| Irgafos 168 | 0.05 | 0.5 | 0.5 | 2 | 0.5 | 0.5 |
| Irganox L 109 | 0.05 | 0.5 | 0.5 | 2 | 0.5 | 0.5 |
| Irganox L 107 | 0.05 | 0.5 | 0.5 | 2 | 0.5 | 0.5 |
| Bondine HX 8290 | 15 | 15 | 14 | 12 | | |
| Microsere 5999A | 1 | 3 | 3 | 2.2 | 3 | 3 |
| Stearic acid | 0.30 | 0.3 | 0.3 | 0.3 | 0.3 | 0.3 |
| Talc 1250 | 3.545 | 3.6 | 3.7 | 2 | 7.7 | 12.7 |
| Monarch 580 | 0.5 | 0.5 | 0.5 | 0.5 | 0.5 | 0.5 |

TABLE 1B

Foaming composition

| Components | Example 7 | Example 8 | Example 9 |
|---|---|---|---|
| Elvax 250 | 5 | 5 | 5 |
| Elvax 260 | 3 | 3 | 3 |
| Elvax 460 | 46 | 45 | 46 |
| OBSH | 25 | 24 | 25 |
| SR350 | 2 | 2 | 2 |
| DCP40 | 2 | 2 | 2 |
| Varox 231XL | 2 | 1 | 1 |
| Fujicure-FXR-1090FA | | 0.5 | 0.5 |
| Irganox 1010 | 0.5 | | 0.5 |
| Irgafos 168 | 0.5 | 0.5 | |
| Irganox L 109 | 0.5 | | 0.5 |
| Irganox L 107 | 0.5 | | 0.5 |
| Bondine HX 8290 | | | |
| Microsere 5999A | 3 | 3 | 3 |
| Stearic acid | 0.3 | 0.3 | 0.3 |
| Talc 1250 | 9.2 | 13.2 | 10.2 |
| Monarch 580 | 0.5 | 0.5 | 0.5 |

In Table 2A, 2B, 3A and 3B, the performance of the foaming articles made from the foaming compositions in Example 1 to 9 is reported. All of the foaming articles obtained in Example 1 to 4 had high initial volume expansion ratio (R) in the baking window of 130 to 200° C. and showed good stability after 6 months' storage under a condition of 40° C. and 50% RH.

When the content of the crosslinking enhancer was high as shown in Example 5, the foaming article was not expanded sufficiently across the baking window of 130 to 200° C. compared with the foaming articles in Example 1 to 4.

When only a peroxide compound or a polyamine was presented in the foaming composition as shown in Examples 6 and 7, the foaming articles made from the foaming compositions expanded to a less extent across the baking window of 130 to 200° C. compared with the foaming articles obtained in Example 1 to 4. Furthermore, the volume expansion ratio (Rs) of the foaming articles in Example 6 and 7 was smaller than the initial volume expansion ratio (R) after 6 months' storage under a condition of 40° C. and 50% RH.

When only the primary or secondary antioxidant was presented in the foaming composition as shown in Examples 8 and 9, the foaming articles made from the foaming compositions expanded to a less extent across the baking window of 130 to 200° C. compared with the foaming articles obtained in Example 1 to 4. Furthermore, the volume expansion ratio (Rs) of the foaming articles in Example 8 and 9 was smaller than the initial volume expansion ratio (R) after 6 months' storage under a condition of 40° C. and 50% RH.

TABLE 2A

Volume expansion ratio (R) of foaming article

| Volume expansion ratio (R) | Example 1 | Example 2 | Example 3 | Example 4 | Example 5 | Example 6 |
|---|---|---|---|---|---|---|
| 130° C. | 400% | 360% | 400% | 360% | 150% | 150% |
| 140° C. | 800% | 900% | 750% | 850% | 720% | 320% |
| 150° C. | 2600% | 2500% | 2500% | 2400% | 500% | 1300% |
| 160° C. | 2800% | 2700% | 2700% | 2600% | 500% | 1500% |
| 170° C. | 2800% | 2700% | 2700% | 2600% | 320% | 1500% |
| 180° C. | 2800% | 2700% | 2700% | 2600% | 1200% | 1100% |
| 190° C. | 2400% | 2500% | 2400% | 2400% | 100% | 850% |
| 200° C. | 2200% | 2100% | 2100% | 2100% | 50% | 800% |

TABLE 2B

Volume expansion ratio (R) of foaming article

| Volume expansion ratio (R) | Example 7 | Example 8 | Example 9 |
|---|---|---|---|
| 130° C. | 150% | 100% | 50% |
| 140° C. | 420% | 400% | 400% |
| 150° C. | 1400% | 1600% | 1600% |
| 160° C. | 1600% | 1800% | 1800% |
| 170° C. | 1600% | 1800% | 1800% |
| 180° C. | 1200% | 1800% | 1800% |
| 190° C. | 950% | 1050% | 1050% |
| 200° C. | 800% | 650% | 550% |

TABLE 3A

Volume expansion ratio (Rs) of foaming article after 6 months' storage

| Volume expansion ratio after storage (Rs) | Example 1 | Example 2 | Example 3 | Example 4 | Example 5 | Example 6 |
|---|---|---|---|---|---|---|
| 130° C. | 400% | 360% | 400% | 360% | 150% | 50% |
| 140° C. | 900% | 1100% | 950% | 900% | 720% | 320% |
| 150° C. | 2600% | 2500% | 2500% | 2500% | 500% | 900% |
| 160° C. | 2800% | 2700% | 2700% | 2700% | 500% | 1000% |
| 170° C. | 2800% | 2700% | 2700% | 2700% | 320% | 1000% |
| 180° C. | 2800% | 2700% | 2700% | 2700% | 1200% | 1000% |
| 190° C. | 2400% | 2500% | 2400% | 2400% | 100% | 710% |
| 200° C. | 2200% | 2100% | 2100% | 2100% | 50% | 500% |

TABLE 3B

Volume expansion ratio (Rs) of foaming
article after 6 months' storage

| | Volume expansion ratio after storage (Rs) | | |
|---|---|---|---|
| | Example 7 | Example 8 | Example 9 |
| 130° C. | 50% | 50% | 50% |
| 140° C. | 320% | 320% | 320% |
| 150° C. | 700% | 800% | 800% |
| 160° C. | 900% | 900% | 900% |
| 170° C. | 1000% | 900% | 900% |
| 180° C. | 1000% | 600% | 550% |
| 190° C. | 700% | 340% | 440% |
| 200° C. | 400% | 300% | 300% |

It was found that the volume expansion ratio (Rs) of the foaming articles after storage in Example 1 to 4 was at least the same of the initial volume expansion ratio (R) indicating that the foaming articles were stable after 6 month's storage under the condition of 40° C. and 50% RH. It was further found that the volume expansion ratio (Rs) of the foaming article after storage was significantly larger than the initial volume expansion ratio (R) when the foaming articles were heated at the temperature of 140° C. in Example 1 to 4 as shown in Table 4. For instance, the change of volume expansion ratio (Rc) of the foaming article after storage could reach up to 26.7% in Example 3. This suggested that the foaming article made by the foaming composition in the present invention could be stored for a much longer time if the foaming article was to be heated at the temperature of 140° C.

TABLE 4

Change of volume expansion ratio (Rc) of the
foaming article after 6 months' storage

| | The change of volume expansion ratio (Rc) | | | |
|---|---|---|---|---|
| | Example 1 | Example 2 | Example 3 | Example 4 |
| 140° C. | 12.5% | 22.2% | 26.7% | 5.9% |

What is claimed is:

1. A foaming composition comprising:
   (a) from 45 to 70% by weight of at least one ethylene-vinyl acetate (EVA) copolymer;
   (b) at least one foaming agent;
   (c) at least one peroxide compound;
   (d) at least one amine, wherein the at least one amine is selected from diethyltoluenediamine, chlorodiaminobenzene, diethanolamine, diisopropanolamine, triethanolamine, tripropanolamine, 1,6- hexanediamine and any combination thereof;
   (e) at least one crosslinking enhancer, wherein the at least one crosslinking enhancer is selected from trimethylolpropane trimethacrylate, zinc diethyl dithiocarbamate, di(morpholin-4-yl) disulphide, dipentamethylenethiuram tetrasulfide and any combination thereof;
   (f) at least one primary antioxidant; and
   (g) at least one secondary antioxidant;
   wherein the crosslinking enhancer is present in an amount of from 0.1 to 3% by weight based on the total weight of the composition.

2. The foaming composition of claim 1, wherein the at least one foaming agent is selected from 4,4'-oxybis(benzenesulfonyl hydrazide), azodicarbonamide, diisopropyl azodicarboxylate and any combination thereof.

3. The foaming composition of claim 1, wherein the at least one peroxide compound is an organic peroxide compound.

4. The foaming composition of claim 3, wherein the organic peroxide compound is selected from 2,5-dimethyl-2,5-di(tert-butylperoxy) hexane, tert-butyl peroxybenzoate, benzoyl peroxide, di(tert-butylperoxyisopropyl) benzene, dicumyl peroxide, 1,1-di(t-butylperoxy)-3,3,5-trimethylcyclohexane, butyl 4,4-bis(tert-butyldioxy) valerate, and any combination thereof.

5. The foaming composition of claim 1, wherein the at least one primary antioxidant is a phenolic antioxidant.

6. The foaming composition of claim 5, wherein the at least one primary antioxidant is a hindered phenolic antioxidant.

7. The foaming composition of claim 1, wherein the at least one secondary antioxidant is selected from a phosphorus-containing antioxidant, a sulfur-containing antioxidant and any combination thereof.

8. The foaming composition of claim 1, further comprising one or more additives selected from at least one adhesive promoter, at least one filler, at least one lubricant, at least one wax, at least one dye and any combination thereof.

9. The foaming composition of claim 1, wherein (a) the at least one ethylene-vinyl acetate (EVA) copolymer has a vinyl acetate (VA) content of 12% by weight or more and a melt index of 2 to 25 grams per 10 minutes at 190° C./2.16 kg measured by ASTM D1238.

10. A foaming composition comprising components:
   (a) from 45 to 70% by weight of at least one EVA copolymer;
   (b) from 15 to 30% by weight of at least one foaming agent;
   (c) from 0.1 to 10% by weight of at least one peroxide compound;
   (d) from 0.001 to 2% by weight of at least one amine, wherein the at least one amine is selected from diethyltoluenediamine, chlorodiaminobenzene, diethanolamine, diisopropanolamine, triethanolamine, tripropanolamine, 1,6- hexanediamine and any combination thereof;
   (e) from 0.1 to 3% by weight of at least one crosslinking enhancer;
   (f) from 0.04 to 10% by weight of at least one primary antioxidant; and
   (g) from 0.01 to 2% by weight of at least one secondary antioxidant;
   further comprising a component of one or more additives selected from at least one adhesive promoter, at least one filler, at least one lubricant, at least one wax, at least one dye and any combination thereof;
   wherein the weight percentages of all components add up to 100% by weight.

11. The foaming composition of claim 10, wherein the at least one crosslinking enhancer is present in an amount of from 1 to 2% by weight based on the total weight of the composition.

12. A foaming article made by curing the foaming composition of claim 1 at a temperature of 80 to 120° C.

13. The foaming article of claim 12, having a change of volume expansion ratio (Rc) of at least 5% after the foaming article is stored under a condition of 40° C. and 50% RH for 6 months and heated at 140° C.

14. A foaming article made by the steps of:
   a) mixing the components of the foaming composition of claim 1 to form a homogeneous mixture in the temperature of 15 to 55° C.;
   b) obtaining foaming granules by graining the homogeneous mixture by extrusion in a temperature range of 90 to 100° C.; and
   c) forming the foaming article from the foaming granules by injection molding in a temperature range of 95 to 105° C.

15. The foaming article of claim 14, having a change of volume expansion ratio (Rc) of at least 5% after the foaming article is stored under a condition of 40° C. and 50% RH for 6 months and heated at 140° C.

16. A foamed article made from the foaming composition of claim 1.

17. A vehicle comprising a vehicle part filled with the foamed article of claim 16.

18. A foaming composition consisting essentially of:
(a) at least two ethylene-vinyl acetate (EVA) copolymers;
(b) at least one foaming agent;
(c) at least one peroxide compound;
(d) at least one amine, wherein the at least one amine is selected from diethyltoluenediamine, chlorodiaminobenzene, diethanolamine, diisopropanolamine, triethanolamine, tripropanolamine, 1,6- hexanediamine and any combination thereof;
(e) at least one crosslinking enhancer;
(f) at least one primary antioxidant;
(g) at least one secondary antioxidant;
(h) one or more additives selected from at least one adhesive promoter, at least one filler, at least one lubricant, at least one wax, at least one dye and any combination thereof;
wherein the crosslinking enhancer is present in an amount of from 0.1 to 3% by weight based on the total weight of the composition.

\* \* \* \* \*